L. E. SAUNDERS & R. H. WHITE.
ALUMINOUS ABRASIVE.
APPLICATION FILED DEC. 26, 1917.
1,263,607.
Patented Apr. 23, 1918.
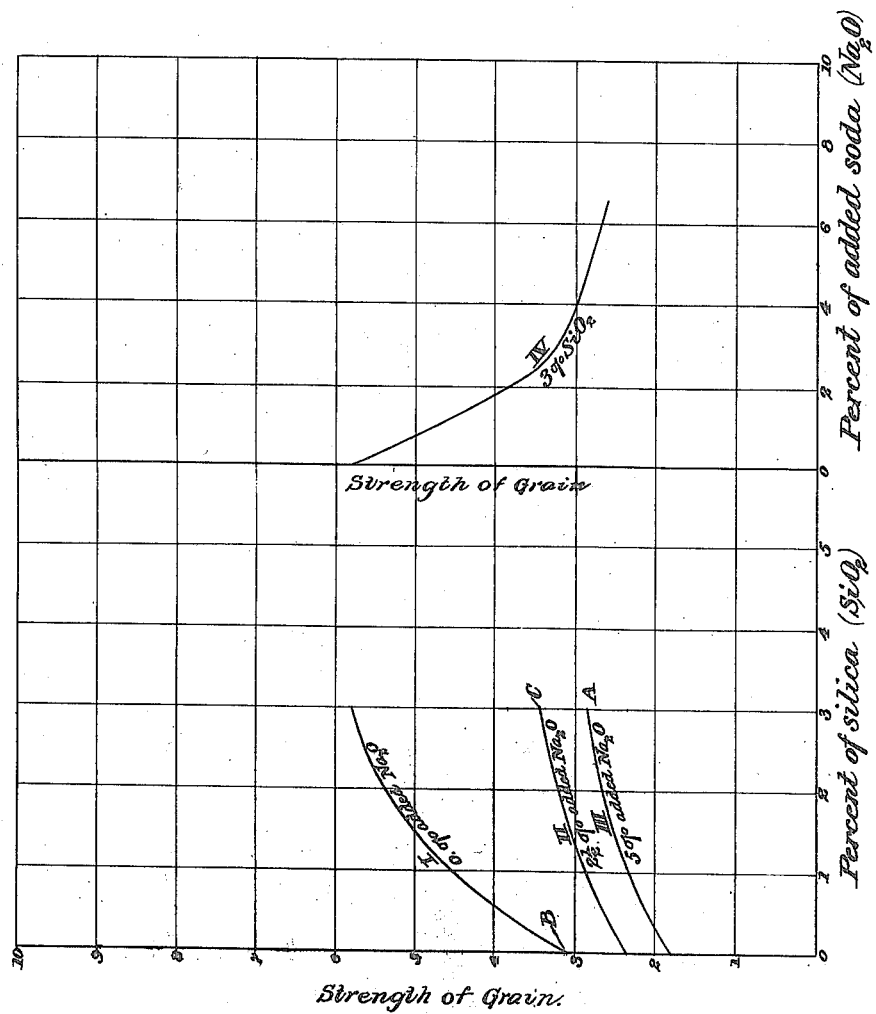

UNITED STATES PATENT OFFICE.

LEWIS E. SAUNDERS AND RAY HILL WHITE, OF NIAGARA FALLS, NEW YORK, ASSIGNORS TO NORTON COMPANY, OF WORCESTER, MASSACHUSETTS, A CORPORATION OF MASSACHUSETTS.

ALUMINOUS ABRASIVE.

1,263,607.   Specification of Letters Patent.   Patented Apr. 23, 1918.

Application filed December 26, 1917.   Serial No. 208,833.

*To all whom it may concern:*

Be it known that we, LEWIS E. SAUNDERS and RAY HILL WHITE, citizens of the United States, residing at Niagara Falls, in the county of Niagara and State of New York, have invented certain new and useful Improvements in Aluminous Abrasives, of which the following is a specification.

This invention relates to a novel crystalline aluminous abrasive containing material proportions of an acid oxid of the silica type, but characterized by a weak grain-structure due to alkali.

It is now well understood by those familiar with electric furnace abrasives of the alumina class that silica in relatively small proportions, say up to four or five per cent., exerts a marked strengthening and toughening action upon the alumina grain, the resulting product being well adapted for certain types of work, but less suited for other operations, such as polishing metals and the like, for which a sufficiently hard but structurally weak grain is required. In the above respect titanium oxid acts substantially like silica, and both oxids are herein referred to as "acid-oxids." Iron oxid, on the other hand, is practically neutral in so far as its effect upon the character of the grain is concerned.

Our researches have shown that the toughening and strengthening effect heretofore regarded as characteristic of silica in such proportions as indicated above, may be neutralized to any desired degree, or completely, by the presence in the finished grain, in proper proportions relatively to the acid oxid, of compounds of one or more of the alkali metals, especially sodium and potassium. In the light of this discovery, we have been enabled, by properly adjusting the amount of alkali in a charge of silicious alumina to produce therefrom an electric furnace abrasive of weak structure, and possessing special advantages for metal polishing and similar purposes. Furthermore, by suitably adjusting the alkali-content of the charge to its content of acid-oxid we are enabled to vary the quality of the grain at will between rather wide limits. This is of advantage in the art because it permits the employment of silicious alumina from any source for the manufacture of abrasives of weak grain structure, a result not heretofore attainable by any known means.

The nature of the effects due to the introduction of varying proportions of soda into a charge of silicious alumina are illustrated in the accompanying drawing, comprising a series of curves exhibiting graphically the effect of composition of the charge upon strength of grain.

The curve indicated by the numeral I illustrates the increasing strength of grain with increasing silica-content up to three per cent., no alkali having been added to the charge, and the quantity of alkali present in the charge before fusion being merely that normally carried by commercially pure alumina, that is to say, in the neighborhood of one per cent. The scale used to represent the grain strength is arbitrary, but it will be observed that additions of silica amounting only to three per cent. have resulted in a marked increase in the strength of grain, as above mentioned.

Curve II illustrates the marked weakening of the grain resulting from the further addition to the charge, before the fusion, of two and one-half per cent. of soda ($Na_2O$) added in the form of soda-ash. Curve III illustrates the further weakening of the grain-structure due to increased additions of soda, amounting in this case to five per cent. Comparing curves I and III it will be observed that the product derived from a charge containing three per cent. of silica associated with five per cent. of added soda (indicated by the point A) is actually weaker than that made from a silica-free alumina to which no alkali addition has been made (indicated by the point B). In other words, the alkali addition has in this case entirely overbalanced the strengthening action of the silica. Similarly, it will be noted that a product derived from a charge containing three per cent. of silica associated with two and one-half per cent. of added alkali (point C on the curve II) is practically comparable, so far as strength of grain is concerned, with a product derived from substantially pure alumina (point B on curve I). It will thus be seen that on the basis of these curves, products showing an extremely wide variation in strength of grain may be prepared at will, even though the alumina serving as the raw material is associated with material amounts of silica.

Curve IV shows graphically the effect of increasing additions of soda in weakening the grain prepared from a charge containing three per cent. of silica, the curve covering a range of added alkali from zero to more than six per cent.

The alkali addition, typified by soda and analytically reported as $Na_2O$, may be introduced into the charge in any desired manner, for example in the form of soda-ash, caustic soda, sodium sulfate or aluminate, etc. In making the addition, proper account will of course be taken of the alkali-content, if any, of the raw material used. For example, one suitable raw material for the practice of the present process in silicious alumina derived from alunite; while this material may vary rather widely in composition according to the method used in its preparation, and the care employed, it usually contains from three to eight per cent. of silica; in the neighborhood of one per cent. of iron oxid; and from one to three per cent. of alkali calculated as $K_2O$.

The furnacing operation is carried out under temperature conditions to avoid, as far as may be practicable, the elimination of the alkali by volatilization, inasmuch as the relative content of alkali and acid-oxid is a controlling factor in determining the character of the product. Some loss of alkali is of course to be expected in furnacing at a temperature sufficient to fuse the alumina, but the alkali-content of the charge is readily adjusted in such manner as to yield a product of the character desired. Generally speaking, it has been observed that the loss of alkali in the furnacing operation ranges between thirty and fifty per cent. of the total quantity in the charge.

In a copending application Serial No. 152,099, filed March 2, 1917, we have pointed out that alkali additions made in small proportions to substantially pure alumina, followed by fusion in the electric furnace, yield a product characterized by the presence of material proportions of alumina in the crystal form which is now known as the beta modification. This transformation of alumina to the beta modification has not been observed to any material extent where the alkali addition is made in like small proportions to silicious alumina. However, by sufficient addition of alkali the charge may be more or less completely transformed to the beta modification. For example, the composition indicated at the point A of curve III contained approximately fifty per cent. of beta-alumina.

In other words, the acid-oxids $SiO_2$ and $TiO_2$, and alkali, co-act in such manner that the alkali is capable of neutralizing the normal grain-strengthening effect of the acid-oxids; while on the other hand, the acid-oxids when present in sufficient proportion are capable of inhibiting the transformation of alumina into the beta modification. By a proper proportioning of these components it is clear therefore that a wide variety of crystalline aluminous products may be prepared, with adaptation of the product to special uses in the abrasive art.

As stated above, $TiO_2$ is to be regarded as equivalent to $SiO_2$ for the purposes of this invention, both in its toughening and strengthening effect upon the alumina grains, and in respect to the neutralization of this effect by the alkali.

We claim:—

1. A crystalline aluminous abrasive characterized by the presence therein of material amounts of an acid-oxid and an alkali, these components so proportioned as to yield a relatively weak abrasive grain as compared with aluminous grains of like acid-oxid content but substantially free from alkali.

2. A crystalline aluminous abrasive characterized by the presence therein of material amounts of silica and an alkali, these components so proportioned as to yield a relatively weak abrasive grain as compared with aluminous grains of like silica-content but substantially free from alkali.

In testimony whereof we affix our signatures.

LEWIS E. SAUNDERS.
RAY HILL WHITE.

Correction in Letters Patent No. 1,263,607.

It is hereby certified that in Letters Patent No. 1,263,607, granted April 23, 1918, upon the application of Lewis E. Saunders and Ray Hill White, of Niagara Falls, New York, for an improvement in "Aluminous Abrasives," an error appears in the printed specification requiring correction as follows: Page 2, line 20, for the word "in" read *is;* and that the said Letters Patent should be read with this correction therein that the same may conform to the record of the case in the Patent Office.

Signed and sealed this 14th day of May, A. D.. 1918.

[SEAL.]

R. F. WHITEHEAD,

*Acting Commissioner of Patents.*

Cl. 204—64.